(12) United States Patent
Ono

(10) Patent No.: US 10,961,685 B2
(45) Date of Patent: Mar. 30, 2021

(54) METHOD OF CONTROLLING MOTOR GRADER AND MOTOR GRADER

(71) Applicant: KOMATSU LTD., Tokyo (JP)

(72) Inventor: Yutaka Ono, Tokyo (JP)

(73) Assignee: KOMATSU LTD., Tokyo (JP)

( * ) Notice: Subject to any disclaimer, the term of this patent is extended or adjusted under 35 U.S.C. 154(b) by 316 days.

(21) Appl. No.: 16/082,655

(22) PCT Filed: Feb. 27, 2017

(86) PCT No.: PCT/JP2017/007457
§ 371 (c)(1),
(2) Date: Sep. 6, 2018

(87) PCT Pub. No.: WO2017/163768
PCT Pub. Date: Sep. 28, 2017

(65) Prior Publication Data
US 2019/0024340 A1    Jan. 24, 2019

(30) Foreign Application Priority Data
Mar. 23, 2016 (JP) .............................. JP2016-058842

(51) Int. Cl.
| | |
|---|---|
| *E02F 3/815* | (2006.01) |
| *E02F 3/84* | (2006.01) |
| *E02F 3/76* | (2006.01) |
| *B60K 25/04* | (2006.01) |
| *E02F 9/20* | (2006.01) |

(52) U.S. Cl.
CPC ............ *E02F 3/8152* (2013.01); *B60K 25/04* (2013.01); *E02F 3/76* (2013.01); *E02F 3/7631* (2013.01); *E02F 3/845* (2013.01); *E02F 9/2004* (2013.01); *E02F 3/842* (2013.01)

(58) Field of Classification Search
CPC ................ E02F 3/815; E02F 3/84; E02F 3/76
See application file for complete search history.

(56) References Cited

U.S. PATENT DOCUMENTS

| | | | |
|---|---|---|---|
| 5,612,864 A | 3/1997 | Henderson | |
| 5,647,439 A * | 7/1997 | Burdick | ................ E01C 19/004 172/4.5 |
| 5,764,511 A * | 6/1998 | Henderson | .............. E02F 3/842 172/4.5 |
| 5,951,613 A * | 9/1999 | Sahm | ...................... E02F 3/847 37/348 |
| 6,286,606 B1 | 9/2001 | Krieg et al. | |
| 6,389,345 B2 | 5/2002 | Phelps | |

(Continued)

FOREIGN PATENT DOCUMENTS

| | | |
|---|---|---|
| CN | 103415783 A | 11/2013 |
| CN | 103806365 A | 5/2014 |

(Continued)

*Primary Examiner* — Kira Nguyen
(74) *Attorney, Agent, or Firm* — Faegre Drinker Biddle & Reath LLP

(57) ABSTRACT

A motor grader includes a blade between a front wheel and a rear wheel, the blade being attached to a swing circle which adjusts a blade angle. A control method performed in the motor grader includes obtaining current topography in front of the motor grader and adjusting the blade angle to an angle in accordance with the current topography by revolving the swing circle.

20 Claims, 11 Drawing Sheets

(56) References Cited

U.S. PATENT DOCUMENTS

| | | | |
|---|---|---|---|
| 6,470,606 B1 | 10/2002 | Nagahiro et al. | |
| 6,655,465 B2 * | 12/2003 | Carlson | E02F 3/847 172/4.5 |
| 7,178,606 B2 * | 2/2007 | Pecchio | E02F 3/764 172/6 |
| 7,249,641 B2 * | 7/2007 | Dommert | B62D 55/08 180/9.1 |
| 7,676,967 B2 * | 3/2010 | Gharsalli | G01S 13/06 37/348 |
| 8,983,738 B2 | 3/2015 | Avitzur et al. | |
| 9,176,235 B2 * | 11/2015 | Nichols | G01S 19/40 |
| 2006/0042804 A1 | 3/2006 | Pecchio | |
| 2010/0121540 A1 * | 5/2010 | Kumagai | G01C 11/06 701/50 |
| 2013/0255977 A1 * | 10/2013 | Braunstein | E02F 3/765 172/4.5 |
| 2013/0304331 A1 * | 11/2013 | Braunstein | E02F 3/844 701/50 |
| 2014/0266859 A1 | 9/2014 | Kurihara et al. | |
| 2015/0240453 A1 * | 8/2015 | Jaliwala | E02F 9/264 701/50 |
| 2016/0230367 A1 * | 8/2016 | Hendron | E02F 3/7627 |

FOREIGN PATENT DOCUMENTS

| | | |
|---|---|---|
| JP | S59-102023 A | 6/1984 |
| JP | 2003-13419 A | 1/2003 |
| JP | 2004-076499 A | 3/2004 |
| JP | 2009-41342 A | 2/2009 |
| JP | 2014-215039 A | 11/2014 |
| JP | 2015-125760 A | 7/2015 |
| WO | WO-00/36231 A1 | 6/2000 |

* cited by examiner

FIG.4
(A)
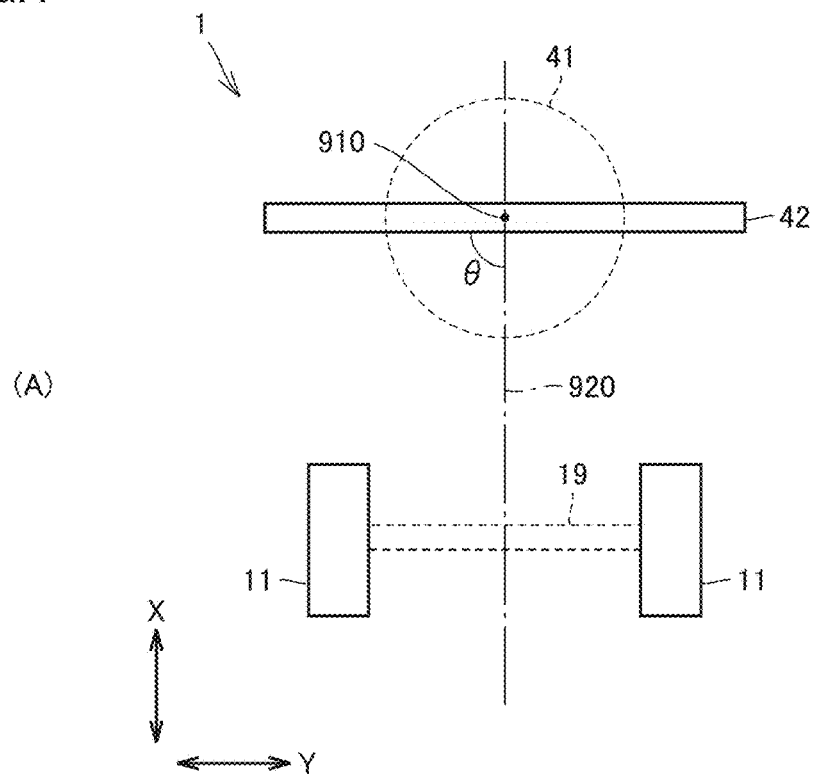
(B)
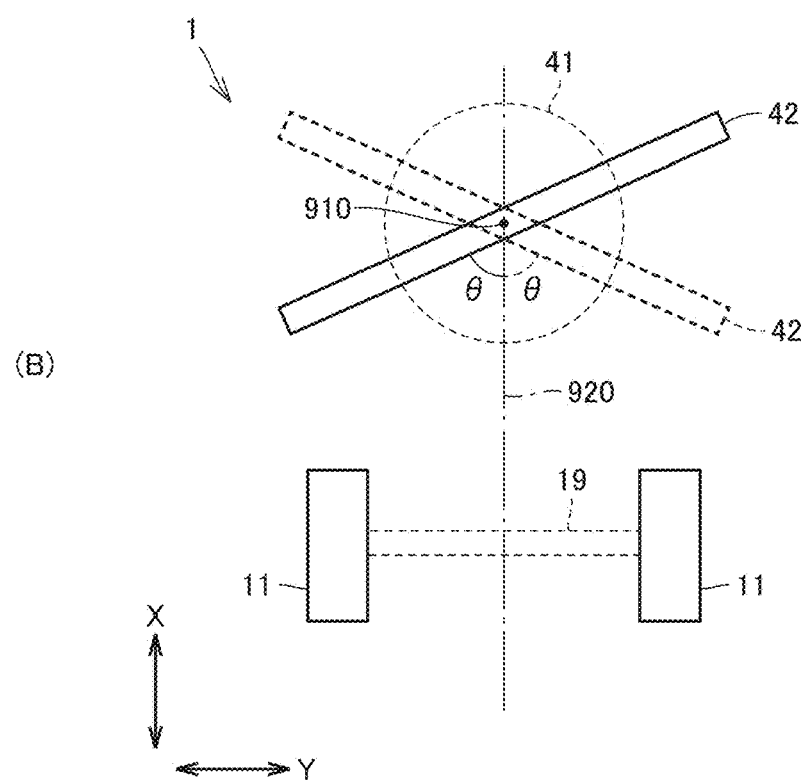

METHOD OF CONTROLLING MOTOR GRADER AND MOTOR GRADER

TECHNICAL FIELD

The present invention relates to a method of controlling a motor grader and a motor grader.

BACKGROUND ART

A motor grader has conventionally been known as a work vehicle.

For example, U.S. Pat. No. 6,286,606 (PTD 1) discloses a method and apparatus for controlling a blade movably connected to a motor grader. The controller of the motor grader automatically controls simultaneous first and second control modes of operation assigned to the blade. A sensor applies a signal to the controller indicating position of the blade. The controller reverses the simultaneous first and second control modes assigned to the blade upon detecting a predetermined movement of the blade. The simultaneous first and second control mode assignments may also be changed by actuation of a manually actuatable device.

U.S. Pat. No. 6,389,345 (PTD 2) discloses a method and the like for determining the cross slope created by a blade on a motor grader. The method includes the steps of determining a position of the work implement, determining a direction of travel of the motor grader, and responsively determining the cross slope.

CITATION LIST

Patent Document

PTD 1: U.S. Pat. No. 6,286,606
PTD 2: U.S. Pat. No. 6,389,345

SUMMARY OF INVENTION

Technical Problem

Topography (current topography) to be graded by a motor grader may include a recess such as a cavity or a projection raised by soil. When the recess and the projection are graded at a blade angle as in other locations in such a case, the current topography may not accurately be graded. Consequently, land-grading works should be redone and efficiency in works is lowered. Such a problem arises also in the motor graders disclosed in PTDs 1 and 2.

The present invention was made in view of the problems above, and an object thereof is to provide a motor grader and a method of controlling a motor grader which can achieve improvement in efficiency in works.

Solution to Problem

According to one aspect of the present invention, a method of controlling a motor grader is performed in a motor grader, the motor grader including a blade between a front wheel and a rear wheel, the blade being attached to a swing circle which adjusts a blade angle. The method includes obtaining current topography in front of the motor grader and adjusting the blade angle of the blade to an angle in accordance with the current topography by revolving the swing circle.

Advantageous Effects of Invention

According to the invention above, efficiency in works can be improved.

BRIEF DESCRIPTION OF DRAWINGS

FIG. 4 is a diagram for illustrating a blade angle.

DESCRIPTION OF EMBODIMENTS

Figure 1:
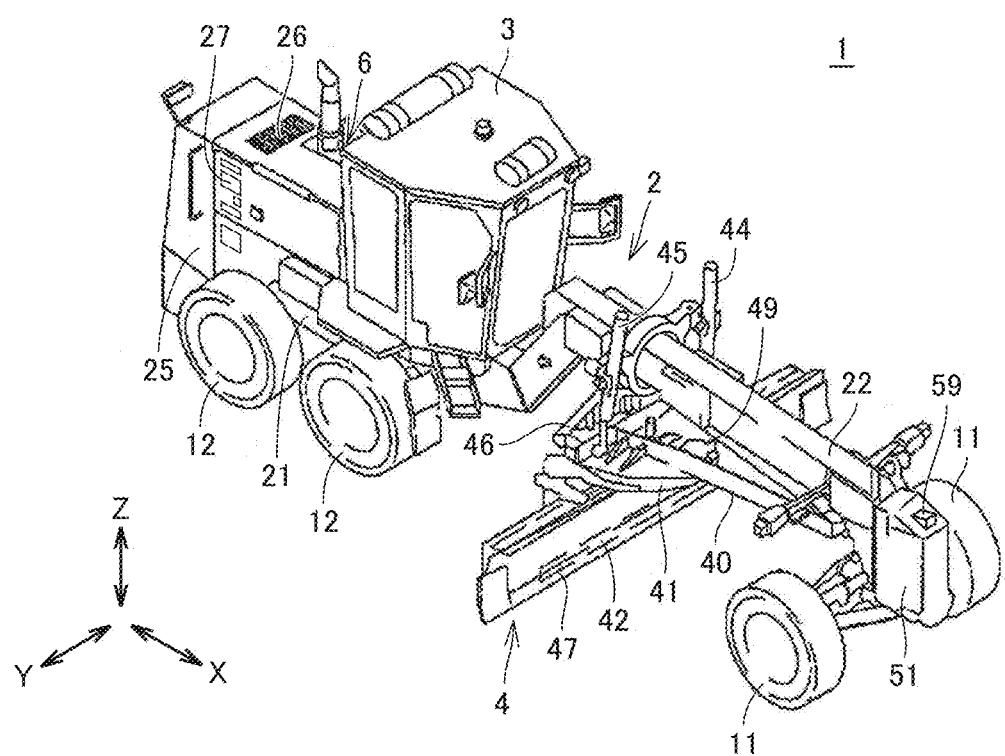
FIG. 1 is a perspective view schematically showing a construction of a motor grader.

A motor grader according to an embodiment will be described below. The same elements have the same reference characters allotted in the description below and their labels and functions are also the same. Therefore, detailed description thereof will not be repeated.

<A. Appearance>

Figure 2:
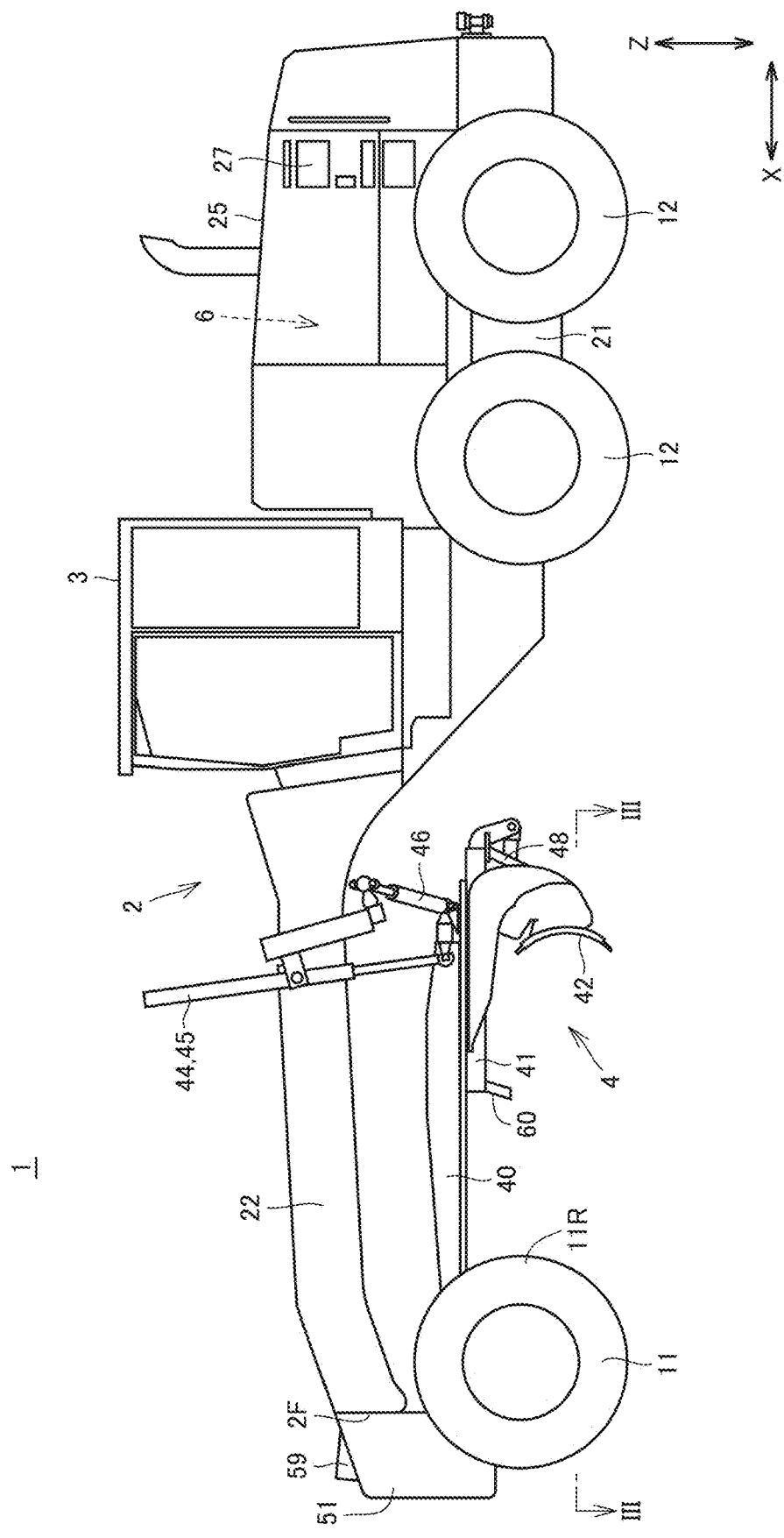
FIG. 2 is a side view schematically showing the construction of the motor grader.

FIG. 1 is a perspective view schematically showing a construction of a motor grader 1 in one embodiment of the present invention. FIG. 2 is a side view schematically showing the construction of motor grader 1. As shown in FIGS. 1 and 2, motor grader 1 in the present embodiment mainly includes running wheels 11 and 12, a vehicular body frame 2, a cab 3, and a work implement 4. Motor grader 1 includes components such as an engine arranged in an engine compartment 6. Work implement 4 includes a blade 42. Motor grader 1 can do such works as land-grading works, snow removal works, light cutting, and mixing of materials with blade 42.

Running wheels 11 and 12 include a front wheel 11 and a rear wheel 12. Though FIGS. 1 and 2 show running wheels consisting of two front wheels 11 one on each side and four rear wheels 12 two on each side, the number of front wheels and rear wheels and arrangement thereof are not limited as such.

In the description of the drawings below, a fore/aft direction means a fore/aft direction of motor grader 1. Namely, the fore/aft direction means a fore/aft direction when viewed from an operator who sits at an operator's seat in cab 3. A lateral direction or a side direction means a direction of a vehicle width of motor grader 1. Namely, the lateral direction, the direction of the vehicle width, or the side direction means the lateral direction when viewed from the operator who sits at the operator's seat in cab 3. In the drawings below, the fore/aft direction is shown with an arrow X, the lateral direction is shown with an arrow Y, and an up/down direction is shown with an arrow Z.

Vehicular body frame 2 includes a rear frame 21, a front frame 22, and an exterior cover 25. Rear frame 21 supports exterior cover 25 and components such as the engine arranged in engine compartment 6. Exterior cover 25 covers engine compartment 6. Exterior cover 25 is provided with an upper opening 26, a lateral opening 27, and a rear opening. Upper opening 26, lateral opening 27, and the rear opening are provided to pass through exterior cover 25 in a direction of thickness.

For example, each of four rear wheels 12 is attached to rear frame 21 as being rotatably driven by driving force from the engine. Front frame 22 is attached in front of rear frame 21. For example, two front wheels 11 are rotatably attached to a front end portion of front frame 22.

A counter weight 51 is attached to a tip end portion of front frame 22. An image pick-up apparatus 59 for picking up an image of current topography in front of motor grader 1 is attached to counter weight 51.

A position of attachment of image pick-up apparatus 59 is not limited to the position above, and it is not particularly limited so long as an image of current topography in front of motor grader 1 can be picked up. For example, the image pick-up apparatus may be provided on an upper surface of front frame 22. Typically, a stereo camera is adopted as image pick-up apparatus 59.

Cab 3 is carried on front frame 22. In cab 3, an operation portion (not shown) such as a steering wheel, a gear shift lever, a lever for controlling work implement 4, a brake, an accelerator pedal, and an inching pedal is provided. Cab 3 may be carried on rear frame 21.

Work implement 4 mainly includes a draw bar 40, a swing circle 41, a blade 42, a slewing motor 49, and various hydraulic cylinders 44 to 48.

Draw bar 40 has a front end portion swingably attached to the front end portion of front frame 22. Draw bar 40 has a rear end portion supported on front frame 22 by a pair of lift cylinders 44 and 45. As a result of synchronous extending and retracting of the pair of lift cylinders 44 and 45, the rear end portion of draw bar 40 can move up and down with respect to front frame 22. Draw bar 40 is vertically swingable with an axis along a direction of travel of the vehicle being defined as the center, as a result of extending and retracting of lift cylinders 44 and 45 different from each other.

A draw bar shift cylinder 46 is attached to front frame 22 and a side end portion of draw bar 40. As a result of extending and retracting of draw bar shift cylinder 46, draw bar 40 is movable laterally with respect to front frame 22.

Figure 3:
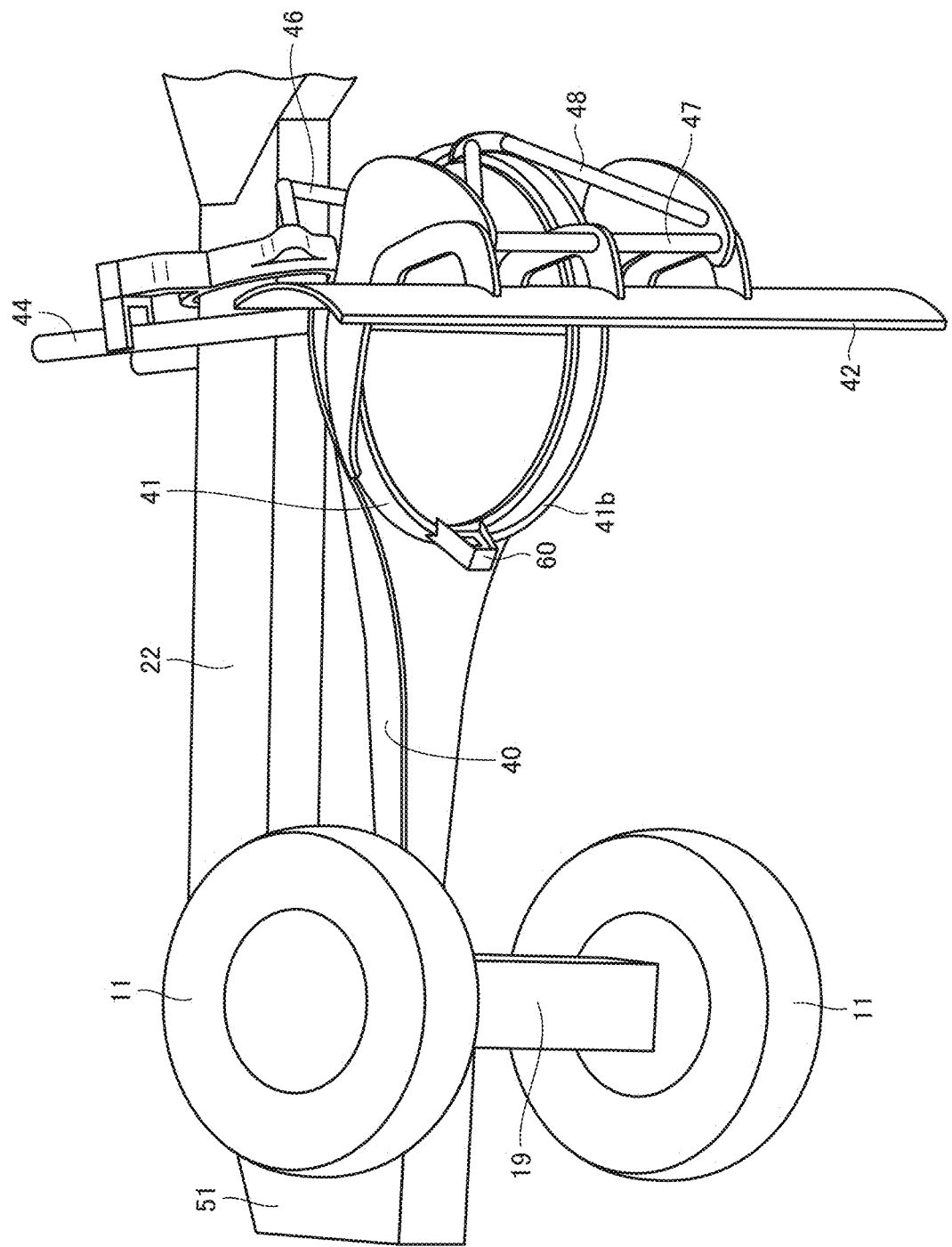
FIG. 3 is a perspective view from a different angle, of a work implement shown in FIG. 2.

Swing circle 41 is revolvably (rotatably) attached to the rear end portion of draw bar 40. Swing circle 41 can be driven by slewing motor 49 as being revolvable clockwise or counterclockwise with respect to draw bar 40 when viewed from above the vehicle. As swing circle 41 is driven to revolve, a blade angle of blade 42 is adjusted. The blade angle will be described later (FIG. 3).

Blade 42 is supported as being slidable in the lateral direction with respect to swing circle 41 and as being vertically swingable with an axis in parallel to the lateral direction being defined as the center. Specifically, blade shift cylinder 47 is attached to swing circle 41 and blade 42 and arranged along a longitudinal direction of blade 42. With blade shift cylinder 47, blade 42 is movable in the lateral direction with respect to swing circle 41.

A tilt cylinder 48 is attached to swing circle 41 and blade 42. As a result of extending and retracting of tilt cylinder 48, blade 42 swings around the axis in parallel to the lateral direction with respect to swing circle 41, and can change its orientation in the up/down direction. Tilt cylinder 48 can thus change an angle of inclination with respect to the direction of travel of blade 42.

As set forth above, blade 42 is constructed to be able to move up and down with respect to the vehicle, change an inclination with respect to the direction of travel, change an inclination with respect to the lateral direction, rotate, and shift in the lateral direction, with draw bar 40 and swing circle 41 being interposed.

FIG. 3 is a perspective view from a different angle, of work implement 4 shown in FIG. 2. Swing circle 41 includes a lower surface 41b. As shown in FIGS. 1 and 3, an image pick-up apparatus 60 is fixed to lower surface 41b of swing circle 41. Image pick-up apparatus 60 protrudes downward from lower surface 41b of swing circle 41. Image pick-up apparatus 60 is configured to pick up an image of blade 42 from the front.

Image pick-up apparatus 60 is arranged in front of blade 42. Image pick-up apparatus 60 is arranged between blade 42 and a rearmost portion 11R of front wheel 11. Image pick-up apparatus 60 is arranged in front of lift cylinders 44 and 45. Image pick-up apparatus 60 is arranged as facing a front surface of blade 42. Image pick-up apparatus 60 can pick up an image of the front surface of blade 42. Image pick-up apparatus 60 is arranged in the rear of front wheel 11. Image pick-up apparatus 60 is arranged in the rear of a front end 2F of vehicular body frame 2.

Image pick-up apparatus 60 is arranged below front frame 22. Image pick-up apparatus 60 is arranged below draw bar 40. Image pick-up apparatus 60 is arranged below swing circle 41.

Image pick-up apparatus 60 is attached at a position in annular swing circle 41 most distant from blade 42. While swing circle 41 is arranged such that blade 42 extends in the lateral direction, image pick-up apparatus 60 is attached to a foremost portion of swing circle 41.

Image pick-up apparatus 60 is provided as being revolvable (rotatable) together with swing circle 41. Image pick-up apparatus 60 and blade 42 revolve together with revolution and rotation of swing circle 41.

<B. Blade Angle>

FIG. 4 is a diagram for illustrating a blade angle. As shown in states (A) and (B) in FIG. 4, blade 42 rotates around a rotation axis 910 as swing circle 41 is driven to revolve. The state (A) corresponds to the cross-sectional view along the line III-III in FIG. 2.

Front wheel 11 is connected to an axle shaft 19. Axle shaft 19 is orthogonal to a central axis 920 of front frame 22.

A blade angle $\theta$ refers to an angle formed between the direction of travel of the vehicular body and blade 42. Exactly speaking, blade angle $\theta$ refers to an angle formed between the direction of travel of the vehicular body (a forward direction) and blade 42 while motor grader 1 travels straight. In other words, blade angle $\theta$ can be referred to as an angle formed between central axis 920 of front frame 22 and blade 42. Blade angle $\theta$ is normally set in a range between 45 degrees and 60 degrees. A range of blade angle $\theta$ is set to a range not smaller than 0 degree and not larger than 90 degrees.

Figure 5:
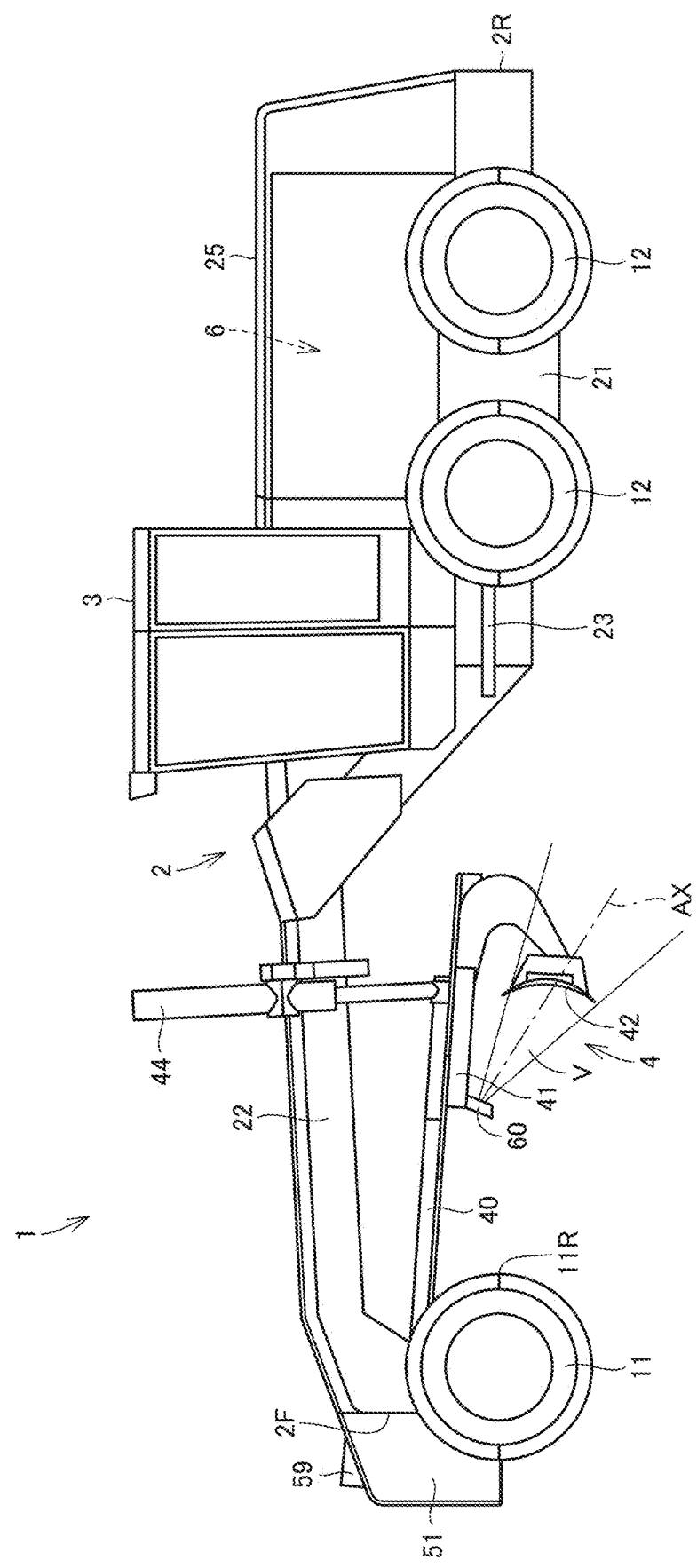
FIG. 5 is a schematic diagram showing a range of image pick-up by an image pick-up apparatus shown in FIG. 3.
Figure 6:
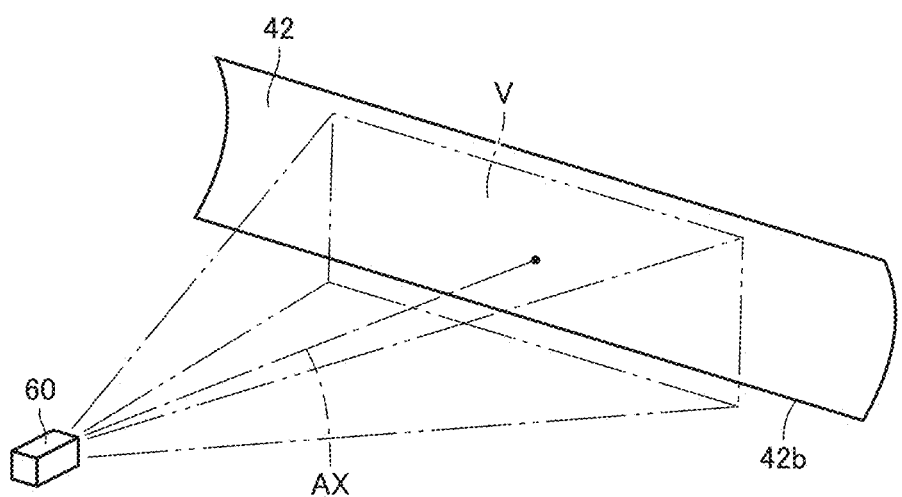
FIG. 6 is a schematic diagram showing a range of image pick-up by the image pick-up apparatus.
Figure 7:
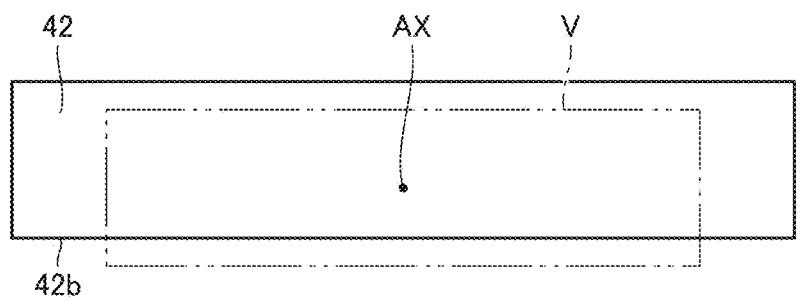
FIG. 7 is a schematic diagram showing a range of image pick-up by the image pick-up apparatus.

FIGS. 5, 6, and 7 are schematic diagrams showing a range of image pick-up by image pick-up apparatus 60 shown in FIG. 3. FIG. 6 schematically shows blade 42 and image pick-up apparatus 60 among components of motor grader 1, in a direction from obliquely front. FIG. 7 schematically shows blade 42 from the front. An optical axis AX shown with a chain dotted line in FIGS. 5 and 6 represents an optical axis of image pick-up apparatus 60.

Optical axis AX is oriented rearward from image pick-up apparatus 60. Optical axis AX forms an angle downward with respect to a horizontal direction. Optical axis AX is inclined at an angle of depression with respect to the horizontal direction. Optical axis AX extends through a position of blade 42. Optical axis AX intersects with blade 42 as shown in FIGS. 6 and 7.

A range between two solid lines which radially extend from image pick-up apparatus 60 shown in FIG. 5 represents an angle of view V of image pick-up apparatus 60. A range surrounded by chain double dotted lines shown in FIGS. 6 and 7 represents angle of view V of image pick-up apparatus 60. Image pick-up apparatus 60 picks up an image of an object included in angle of view V.

Blade 42 is included in the range of image pick-up by image pick-up apparatus 60. A part of blade 42 is included in angle of view V of image pick-up apparatus 60. A lower end 42b of blade 42 is included in angle of view V of image pick-up apparatus 60. Image pick-up apparatus 60 picks up an image of the front surface of blade 42. Image pick-up apparatus 60 can pick up an image of soil built up on the front surface of blade 42 while motor grader 1 travels forward.

By showing a picked-up image of the front surface of blade 42 on a monitor provided in cab 3, an operator who is on board cab 3 can visually recognize soil built up on the front surface of blade 42.

<C. System Configuration>

Figure 8:
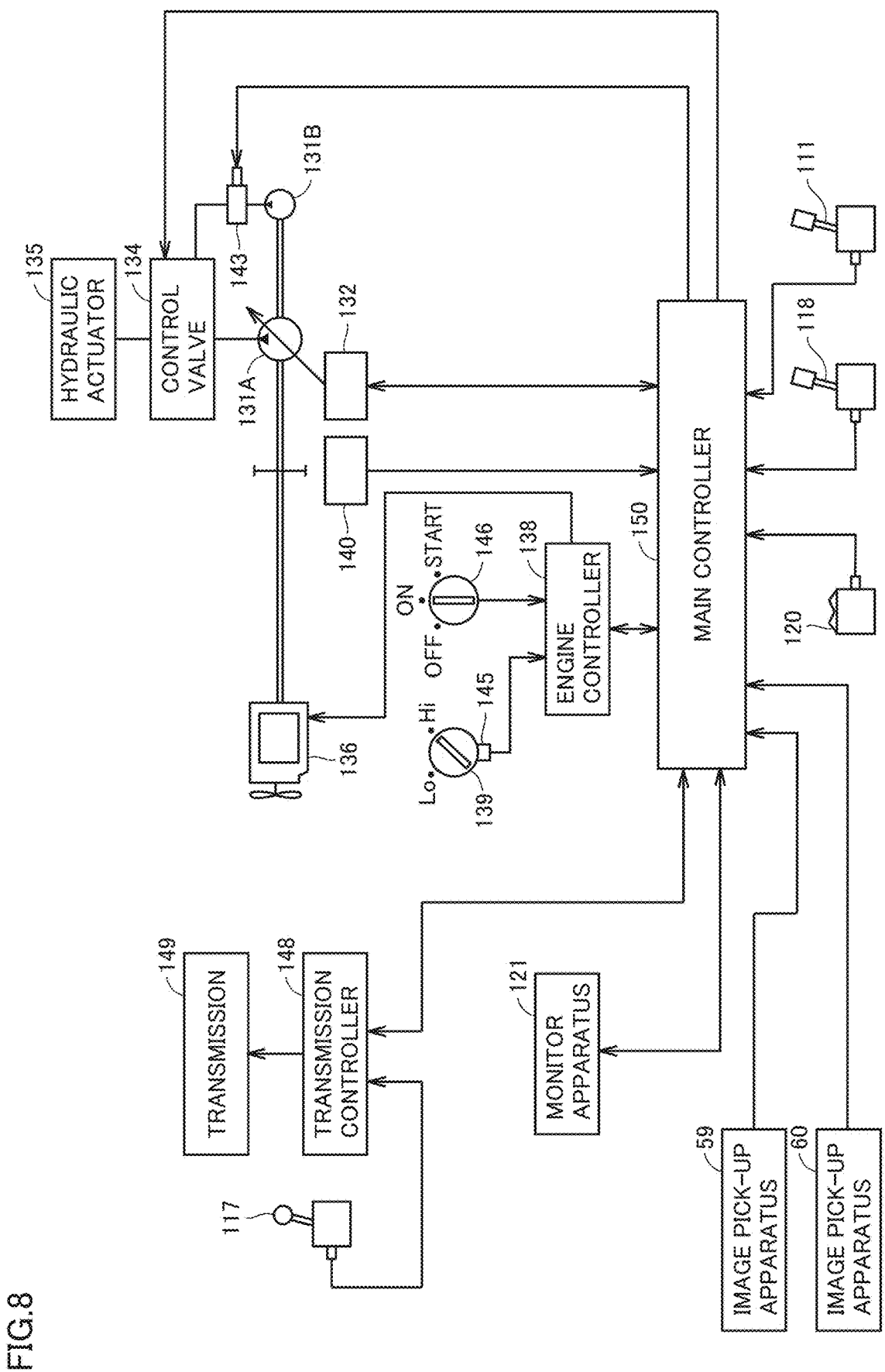
FIG. 8 is a simplified diagram showing a configuration of a control system of the motor grader.

FIG. 8 is a simplified diagram showing a configuration of a control system of motor grader 1. As shown in FIG. 8, the control system of motor grader 1 includes, by way of example, a work implement lever 118, a travel control lever 111, a locking switch 120, a monitor apparatus 121, a first hydraulic pump 131A, a second hydraulic pump 131B, a swash plate drive apparatus 132, a control valve 134, a hydraulic actuator 135, an engine 136, an engine controller 138, a throttle dial 139, an engine rotation sensor 140, a switch valve 143, a potentiometer 145, a starter switch 146, a main controller 150, a gear shift lever 117, a transmission controller 148, a transmission 149, image pick-up apparatus 59, and image pick-up apparatus 60.

First hydraulic pump 131A is implemented by a variable displacement hydraulic motor and delivers hydraulic oil used for driving work implement 4 and the like. Second hydraulic pump 131B is implemented by a fixed displacement hydraulic motor and delivers oil used for a hydraulic pressure (pilot pressure) applied to control valve 134. Swash plate drive apparatus 132 is connected to first hydraulic pump 131A.

Swash plate drive apparatus 132 is driven based on an instruction from main controller 150 and changes an angle of inclination of a swash plate of first hydraulic pump 131A. Hydraulic actuator 135 is connected to first hydraulic pump 131A with control valve 134 being interposed. Hydraulic actuator 135 includes lift cylinders 44 and 45, draw bar shift cylinder 46, blade shift cylinder 47, tilt cylinder 48, and slewing motor 49.

Control valve 134 is implemented by a proportional solenoid valve and connected to main controller 150. Main controller 150 outputs an operation signal (electric signal) in accordance with a direction of operation and/or an amount of operation of work implement lever 118 and travel control lever 111 to control valve 134. Control valve 134 controls an amount of hydraulic oil to be supplied from first hydraulic pump 131A to hydraulic actuator 135 in accordance with the operation signal.

Work implement lever 118, travel control lever 111, and locking switch 120 are connected to main controller 150.

Main controller 150 outputs a lever operation signal (electric signal) in accordance with a state of operation of work implement lever 118 to control valve 134. Main controller 150 outputs a switch operation signal (electric signal) in accordance with a state of operation of locking switch 120 to switch valve 143. Main controller 150 outputs a lever operation signal (electric signal) in accordance with a state of operation of travel control lever 111 to transmission controller 148. Switch valve 143 is implemented by an electromagnetic switch valve.

Engine 136 has a driveshaft connected to first hydraulic pump 131A and second hydraulic pump 131B.

Engine controller 138 controls an operation of engine 136. Engine 136 is implemented by a diesel engine by way of example. The number of rotations of engine 136 is set through throttle dial 139 or the like, and an actual number of rotations of the engine is detected by engine rotation sensor 140. Engine rotation sensor 140 is connected to main controller 150.

Potentiometer 145 is provided in throttle dial 139. Potentiometer 145 detects a set value (an amount of operation) of throttle dial 139. The set value of throttle dial 139 is transmitted to main controller 150. Potentiometer 145 outputs a command value for the number of rotations of engine 136 to engine controller 138. A target number of rotations of engine 136 is adjusted in accordance with the command value.

Engine controller 138 adjusts the number of rotations of engine 136 by controlling an amount of fuel injection by a fuel injection apparatus in accordance with an instruction from main controller 150.

Starter switch 146 is connected to engine controller 138. When an operator operates starter switch 146 (sets start), a start signal is output to engine controller 138 so that engine 136 starts.

Transmission controller 148 controls an operation of transmission 149. Transmission controller 148 outputs an operation signal (electric signal) in accordance with a direction of operation and/or an amount of operation of gear shift lever 117 to transmission 149. A gear position of transmission 149 is changed as a clutch is controlled in accordance with the operation signal. Transmission controller 148 outputs an operation signal (electric signal) in accordance with a direction of operation and/or an amount of operation of gear shift lever 117 to main controller 150.

Main controller 150 is a controller which controls the entire motor grader 1 and implemented by a central processing unit (CPU), a non-volatile memory, a timer, and the like. Main controller 150 controls engine controller 138, transmission controller 148, and monitor apparatus 121. Though a configuration in which main controller 150, engine controller 138, and transmission controller 148 are separate from one another is described in the present example, they can also be implemented as one common controller.

Locking switch 120 is connected to main controller 150. When locking switch 120 is operated toward a locking side, main controller 150 senses that operation and transmits a signal to switch valve 143. Switch valve 143 thus cuts off supply of oil, and hence a function such as an operation of work implement 4 can be stopped.

Image pick-up apparatus 59 is connected to main controller 150. Image pick-up apparatus 59 transmits image data of current topography in front of motor grader 1 obtained as a result of image pick-up to main controller 150 in real time. Main controller 150 analyzes the received image data and determines a condition of the current topography. Details of the determination will be described later.

Image pick-up apparatus 60 is connected to main controller 150. Image pick-up apparatus 60 transmits image data obtained as a result of image pick-up on an amount of soil (a soil amount) held on the front surface of blade 42 to main controller 150 in real time. Main controller 150 analyzes the received image data and determines a condition of the amount of held soil. Details of the determination will be described later.

<D. Control of Blade Angle>

(d1. Action Taken for Recess)

Figure 9:
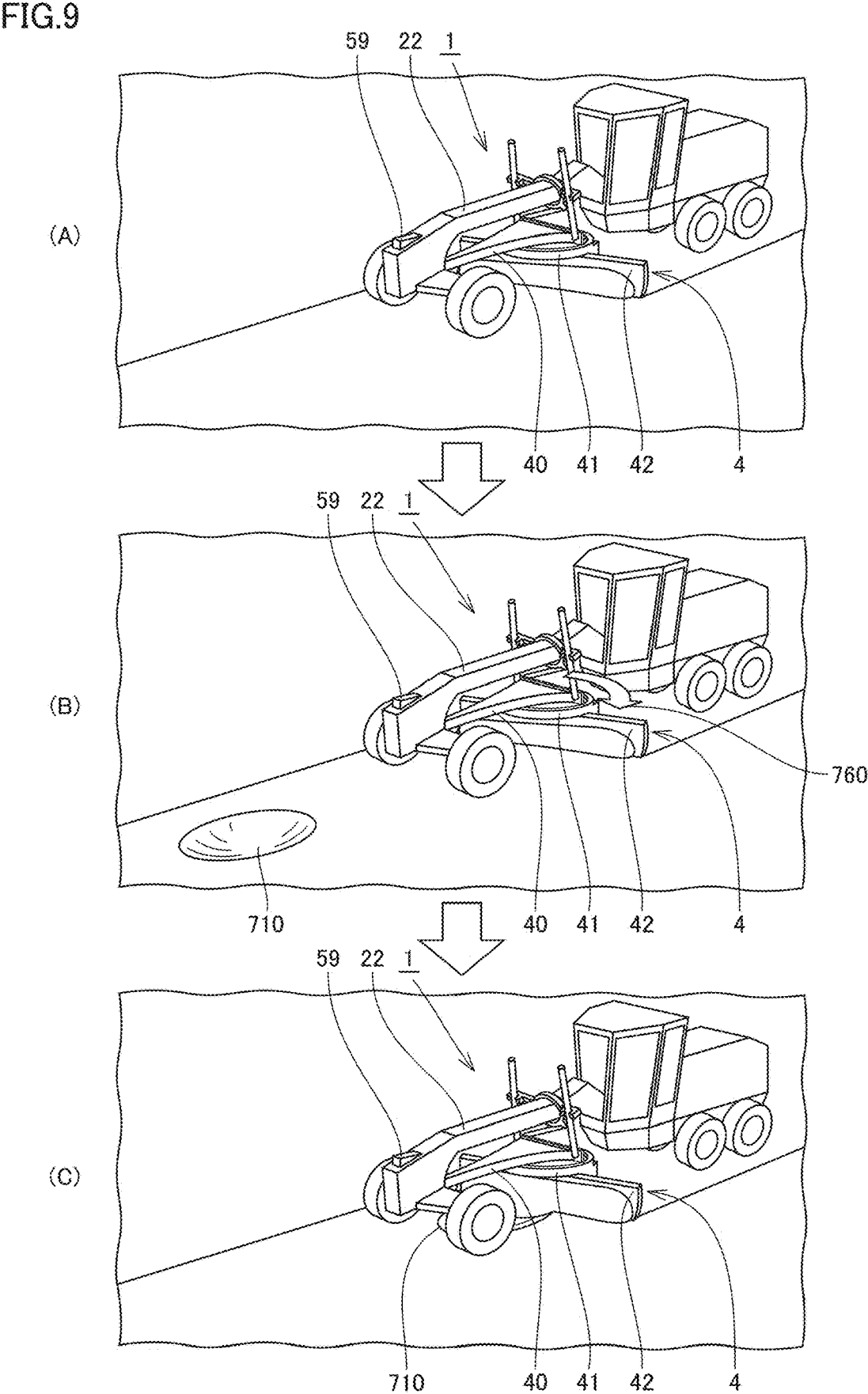
FIG. 9 is a diagram for illustrating control of rotation of a blade when current topography includes a recess.

FIG. 9 is a diagram for illustrating control of rotation of blade 42 when current topography includes a recess. As shown in FIG. 9, a state (A) shows an example in which motor grader 1 has determined the current topography in front of motor grader 1 as being flat (determined as including neither of a recess and a projection). More specifically, the state (A) shows an example in which projections and recesses in the current topography in front of motor grader 1 are smaller than a prescribed reference.

A value of blade angle $\theta$ at this time will be denoted as $\theta 1$ below. 91 specifically represents a blade angle set by an operator of motor grader 1 (an operator command value). $\theta 1$ is typically set between 45 degrees and 60 degrees. Blade angle $\theta$ is automatically controlled within a range not smaller than 0 degree and not larger than 90 degrees below.

A state (B) shows a moment when the current topography in front of motor grader 1 is determined as including a recess 710 while blade angle $\theta$ is set to $\theta 1$. In this case, motor grader 1 revolves swing circle 41 in a direction to make blade angle $\theta$ larger than $\theta 1$ (a direction shown with an arrow 760 in the figure).

As shown in a state (C), motor grader 1 grades recess 710 with blade 42 while blade angle $\theta$ is set to $\theta 2$ ($\theta 2 > \theta 1$). Motor grader 1 revolves swing circle 41 (revolves in a reverse direction) in order to return blade angle $\theta$ from $\theta 2$ to $\theta 1$ (an operator command value) after at least blade 42 has moved past recess 710.

Specifically, motor grader 1 sets blade angle $\theta$ to an angle in accordance with a size of recess 710. Motor grader 1 determines a size of recess 710 based on at least one of a size of an opening of recess 710 and a depth of recess 710.

Furthermore, motor grader 1 obtains an amount of soil (a soil amount) built up on the front surface of blade 42 through image pick-up by image pick-up apparatus 60. Motor grader 1 can optimize the amount of soil held in blade 42 by making use of the amount of soil in a revolving operation of blade 42, so that highly accurate and highly efficient land-grading works can be done.

In consideration of the current topography in front of motor grader 1 and an amount of soil held in blade 42 at the current time point, blade angle 9 is automatically optimally adjusted. A revolving operation of blade 42 is automatically controlled based on the amount of soil built up on the front surface of blade 42.

Specifically, motor grader 1 sets blade angle $\theta$ to an angle in accordance with a size of recess 710 and an amount of soil (a soil amount) built up on the front surface of blade 42. Motor grader 1 revolves swing circle 41 such that blade angle $\theta$ is set to $\theta 2$ which is larger than current blade angle $\theta 1$ when the size of recess 710 is larger than the amount of soil.

The process above is described as follows, with attention being paid to one aspect.

(1) Motor grader 1 adjusts blade angle $\theta$ to an angle in accordance with current topography in front of motor grader 1 by revolving swing circle 41. Since motor grader 1 can thus do works in accordance with the current topography, efficiency in works can be improved.

(2) Motor grader 1 determines whether or not the current topography in front includes a recess. When motor grader 1 determines the current topography as including the recess, it revolves swing circle 41 such that blade angle $\theta$ is larger than blade angle $\theta 1$ set by an operator.

Since motor grader 1 thus makes blade angle $\theta$ larger when the current topography in front includes a recess, blade 42 can hold soil more than when the blade angle is set to blade angle $\theta 1$ set by the operator. Therefore, motor grader 1 can put more soil into the recess than when blade angle $\theta$ is not made larger.

(3) Motor grader 1 determines a size of the recess. When the recess has a first size, motor grader 1 revolves swing circle 41 such that blade angle $\theta$ is set to an angle $\theta 2$ (a first angle). When the recess has a second size larger than the first size, motor grader 1 revolves swing circle 41 such that blade angle $\theta$ is set to an angle $\theta 2'$ (a second angle) larger than angle $\theta 2$.

Thus, as the recess is larger in size, blade angle $\theta$ is larger. Therefore, as the recess is larger in size, motor grader 1 can hold more soil in blade 42. Therefore, motor grader 1 can put more soil into the recess than in a configuration in which blade angle $\theta$ is not controlled in accordance with a size of the recess.

(4) Motor grader 1 determines a size of the recess and an amount of soil held in the blade. When the size of the recess is larger than the amount of soil held in the blade, motor grader 1 revolves swing circle 41 such that blade angle $\theta$ is set to angle $\theta 2$ (first angle).

Thus, blade angle $\theta$ is determined in accordance with a size of the recess and an amount of soil held in the blade. Therefore, motor grader 1 can hold more soil in blade 42 as the recess is larger in size. Furthermore, adjustment to an amount of held soil optimal for a size of the recess can be made. Since motor grader 1 can make adjustment to an optimal amount of soil held in the blade in accordance with a size of the recess, accuracy in land-grading and fuel efficiency can be improved.

(d2. Action Taken for Projection)

Figure 10:
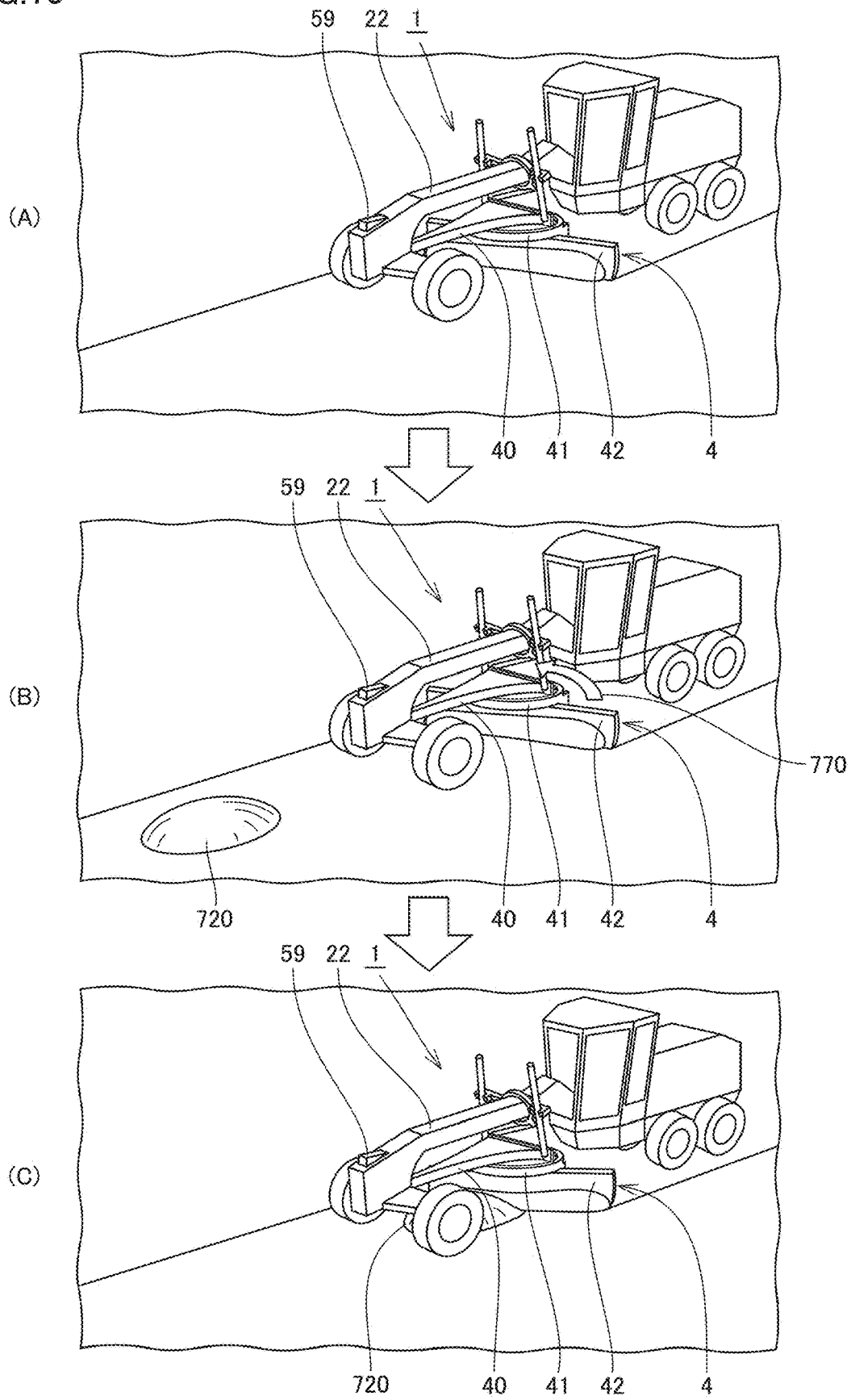
FIG. 10 is a diagram for illustrating control of rotation of the blade when current topography includes a projection.

FIG. 10 is a diagram for illustrating control of rotation of blade 42 when current topography includes a projection. As shown in FIG. 10, a state (A) shows an example in which the current topography in front of motor grader 1 is determined as being flat (determined as neither a recess nor a projection). More specifically, the state (A) shows an example in which projections and recesses in the current topography in front of motor grader 1 are smaller than a prescribed reference as in the state (A) in FIG. 9.

As in FIG. 9, a value of blade angle $\theta$ at this time is denoted as $\theta 1$ below. As described above, $\theta 1$ represents a value set by an operator.

A state (B) shows a moment when the current topography in front of motor grader 1 is determined as including a projection 720 while blade angle $\theta$ is set to $\theta 1$. In this case, motor grader 1 revolves swing circle 41 in a direction to make blade angle $\theta$ smaller than $\theta 1$ (a direction shown with an arrow 770 in the figure).

As shown in a state (C), motor grader 1 grades projection 720 with blade 42 while blade angle θ is set to θ3 (θ3<θ1). Motor grader 1 revolves swing circle 41 (revolves in the reverse direction) in order to return blade angle θ from θ3 to θ1 (operator command value) after at least blade 42 has moved past projection 720.

Specifically, motor grader 1 sets blade angle θ to an angle in accordance with a size of projection 720. Motor grader 1 determines a size of projection 720 at least based on a height of projection 720.

The process above is described as follows, with attention being paid to one aspect.

(1) Motor grader 1 adjusts blade angle θ to an angle in accordance with current topography in front of motor grader 1 by revolving swing circle 41. Since motor grader 1 can thus do works in accordance with the current topography, efficiency in works can be improved.

(2) Motor grader 1 determines whether or not the current topography in front includes a projection. When motor grader 1 determines the current topography as including a projection, it revolves swing circle 41 such that blade angle θ is smaller than blade angle θ1 set by an operator.

Since motor grader 1 thus makes blade angle θ smaller when the current topography in front includes a projection, before the motor grader reaches the projection, an amount of soil held in the blade can be made smaller than before blade angle θ is made smaller (blade angle θ1 set by the operator). Therefore, blade 42 can hold more soil of the projection than when blade angle θ is not made smaller. Therefore, motor grader 1 can more uniformly level soil of the projection than when blade angle θ is not made smaller.

(3) Motor grader 1 determines a size of the projection. When the projection has a first size, motor grader 1 revolves swing circle 41 such that blade angle θ is set to an angle θ3 (a first angle). When the projection has a second size larger than the first size, motor grader 1 revolves swing circle 41 such that blade angle θ is set to an angle θ3' (a second angle) smaller than angle θ3.

Thus, as the projection is larger in size, blade angle θ is smaller. Therefore, as the projection is larger in size, an amount of soil held in blade 42 can be made smaller before motor grader 1 reaches the projection. Therefore, motor grader 1 can level soil more uniformly than in a configuration in which blade angle θ is not controlled in accordance with a size of the projection.

<E. Functional Configuration>

Figure 11:
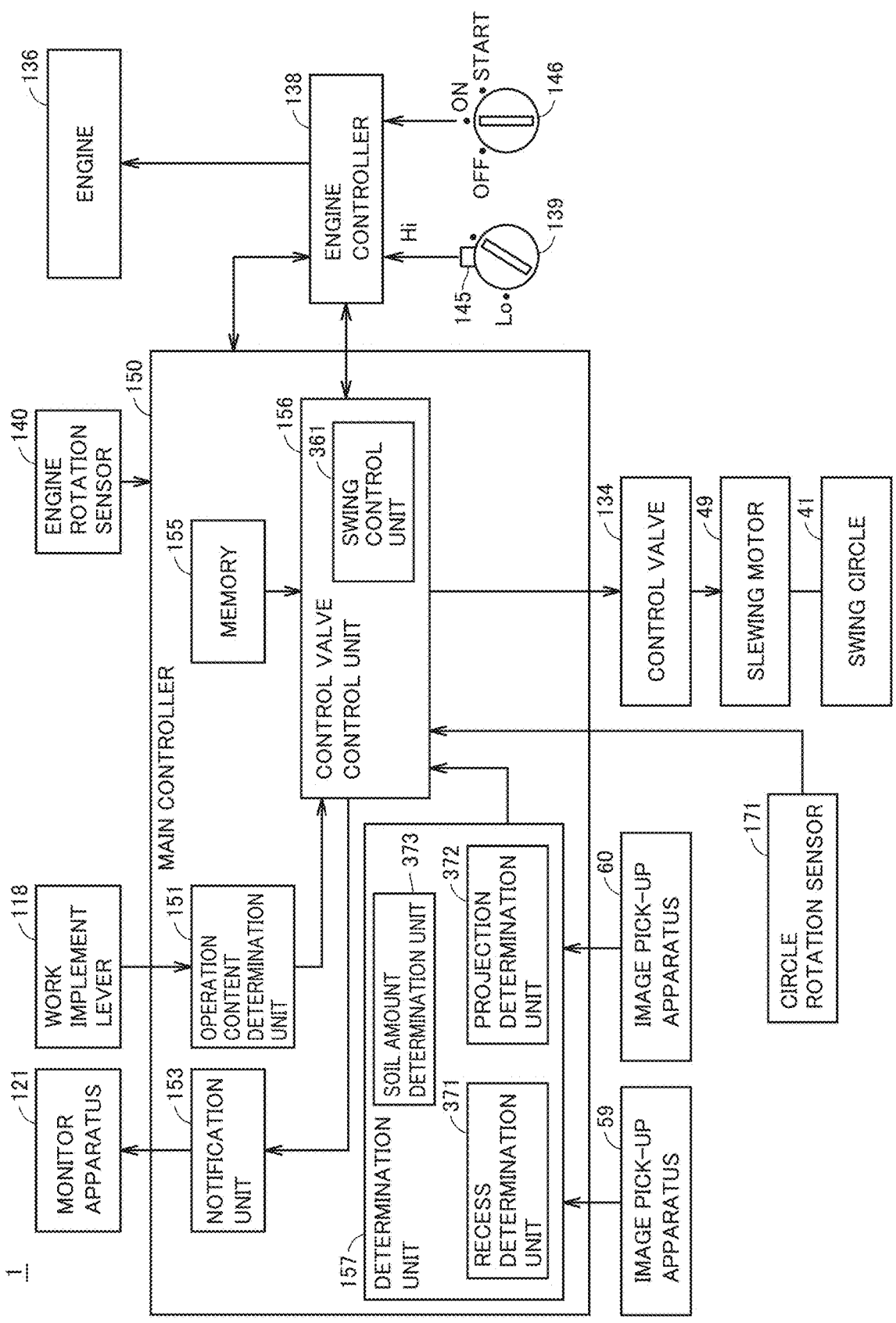
FIG. 11 is a functional block diagram illustrating a main controller in the control system of the motor grader.

FIG. 11 is a functional block diagram illustrating main controller 150 of the control system of motor grader 1.

FIG. 11 shows relation between main controller 150 and other peripherals. Work implement lever 118, monitor apparatus 121, engine 136, engine controller 138, throttle dial 139, potentiometer 145, starter switch 146, engine rotation sensor 140, image pick-up apparatus 59, image pick-up apparatus 60, control valve 134, slewing motor 49, swing circle 41, and circle rotation sensor 171 are shown as the peripherals. Circle rotation sensor 171 detects an angle of rotation (typically, blade angle θ) of swing circle 41. Circle rotation sensor 171 transmits information on the angle of rotation to a control valve control unit 156.

Main controller 150 includes an operation content determination unit 151, a notification unit 153, a memory 155, control valve control unit 156, and a determination unit 157. Control valve control unit 156 includes a swing control unit 361. Determination unit 157 includes a recess determination unit 371, a projection determination unit 372, and a soil amount determination unit 373.

Notification unit 153 instructs monitor apparatus 121 to give guidance information in accordance with an instruction from control valve control unit 156.

Operation content determination unit 151 determines contents of an operation onto work implement lever 118 by an operator. Operation content determination unit 151 outputs a result of determination to control valve control unit 156.

Memory 155 stores various types of information on control of the control valve. Specifically, memory 155 stores information on an engine output torque curve and a pump absorption torque characteristic line.

Image pick-up apparatus 59 picks up an image of current topography in front of motor grader 1. Specifically, image pick-up apparatus 59 picks up an image of current topography within a prescribed range in front of motor grader 1. For example, image pick-up apparatus 59 picks up an image of current topography within a range distant from a tip end portion of motor grader 1 by a prescribed distance (for example, from 1 m to 10 m). Image pick-up apparatus 59 sends image data obtained as a result of image pick-up to determination unit 157.

Image pick-up apparatus 60 picks up an image of the front surface of blade 42. Specifically, image pick-up apparatus 60 picks up an image of soil within a prescribed range in front of blade 42. For example, image pick-up apparatus 60 picks up an image of a condition of soil held on the front surface of blade 42. Image pick-up apparatus 60 sends image data obtained as a result of image pick-up to determination unit 157.

Determination unit 157 determines a state of the current topography and an amount of held soil. Specifically, determination unit 157 determines projections and recesses in the current topography in front of motor grader 1 based on the image data obtained as a result of image pick-up by image pick-up apparatus 59. Specifically, recess determination unit 371 determines whether or not the current topography in front includes a recess. Projection determination unit 372 determines whether or not the current topography in front includes a projection. Specifically, determination unit 157 determines whether or not a recess and a projection are included by analyzing the image data.

Furthermore, determination unit 157 determines a size of the recess. The size of the recess refers to a capacity (a volume) of a cavity, and it is expressed with a unit of cubic meter ($m^3$) by way of example. Determination unit 157 may determine also a size of a projection.

Determination unit 157 determines an amount of soil held on the front surface of blade 42 (a volume of soil) based on the image data obtained by image pick-up apparatus 60. Specifically, soil amount determination unit 373 calculates an amount (a quantity) of soil on the front surface of blade 42. Specifically, soil amount determination unit 373 calculates an amount (a volume) of soil by analyzing the image data. The amount of soil is calculated in unit the same as that for the size of the recess.

The current topography includes at least small projections and recesses because land-grading is incomplete. Motor grader 1 does not have to change blade angle θ for such small projections and recesses. In order not to take such small projections and recesses into consideration, determination unit 157 determines whether or not there are projections and recesses other than the small projections and recesses. Specifically, determination unit 157 determines whether or not there are a recess and a projection equal to or larger than a prescribed reference in front, and when there are a recess and a projection as such, the determination unit determines that there are projections and recesses.

More specifically, when determination unit 157 determines that there is a recess or a projection, it calculates a distance between motor grader 1 and the recess or the projection. For example, a distance from image pick-up apparatus 59 to the recess can be defined as a distance between motor grader 1 and the recess or the projection. Alternatively, a distance calculated by adding a distance between image pick-up apparatus 59 and blade 42 (the center of rotation of blade 42 by way of example) to a distance from image pick-up apparatus 59 to the recess may be defined as a distance between motor grader 1 and the recess or the projection.

When determination unit 157 determines that there is a recess in front, it sends a result of determination to control valve control unit 156. Determination unit 157 further sends the calculated distance (the distance between motor grader 1 and the recess) to control valve control unit 156. Determination unit 157 further determines whether or not an amount of soil held on the front surface of blade 42 is larger than a size of the recess in the current topography, and it notifies control valve control unit 156 of a result of determination.

When determination unit 157 determines that there is a projection in front, it sends a result of determination to control valve control unit 156. Determination unit 157 further sends the calculated distance (the distance between motor grader 1 and the projection) to control valve control unit 156.

Swing control unit 361 outputs an operation command (electric signal) to control valve 134. Swing control unit 361 controls drive by slewing motor 49 by controlling an opening of control valve 134 in accordance with magnitude of a current value representing an output operation command. Swing control unit 361 receives information on an angle of rotation of the circle from circle rotation sensor 171. Swing control unit 361 corrects the electric signal representing the operation command to control valve 134 based on information on the angle of rotation of the circle from circle rotation sensor 171.

Swing control unit 361 will now be described. Swing control unit 361 controls revolution of swing circle 41. Specifically, swing control unit 361 adjusts blade angle θ to an angle in accordance with current topography in front by having the swing circle revolve. Specifically, swing control unit 361 adjusts blade angle θ of blade 42 to an angle in accordance with the current topography and an amount of soil held on the front surface of blade 42 by having swing circle 41 revolve.

Specifically, as described above, when determination unit 157 determines the current topography as including a recess, swing control unit 361 has swing circle 41 revolve such that blade angle θ is larger than blade angle θ1 set by an operator. Specifically, swing control unit 361 controls blade angle θ to be larger as the recess is larger. Specifically, swing control unit 361 controls drive by slewing motor 49 by having control valve 134 moved.

When determination unit 157 determines the current topography as including a projection, swing control unit 361 has swing circle 41 revolve such that blade angle θ is smaller than blade angle θ1 set by the operator. Specifically, swing control unit 361 controls blade angle θ to be smaller as the projection is larger.

Control of blade angle θ is described in further detail as below.

Main controller 150 calculates a time when motor grader 1 (for example, blade 42) will reach a recess or a projection based on a distance calculated by determination unit 157 and a speed of motor grader 1.

In this case, control valve control unit 156 controls at least one of timing to start revolution and a speed of revolution of swing circle 41 such that rotation of blade 42 is completed by the calculated time (for example, such that the blade angle is set to θ2 or θ3). According to such a configuration, blade angle θ can be set to an angle different from θ1 representing the operator command value by the time when motor grader 1 reaches the recess and the projection.

Swing control unit 361 has swing circle 41 rotate (rotate in the reverse direction) in order to return blade angle θ to θ1 representing the operator command value when motor grader 1 has moved past the recess and the projection.

<F. Control Structure>

Figure 12:
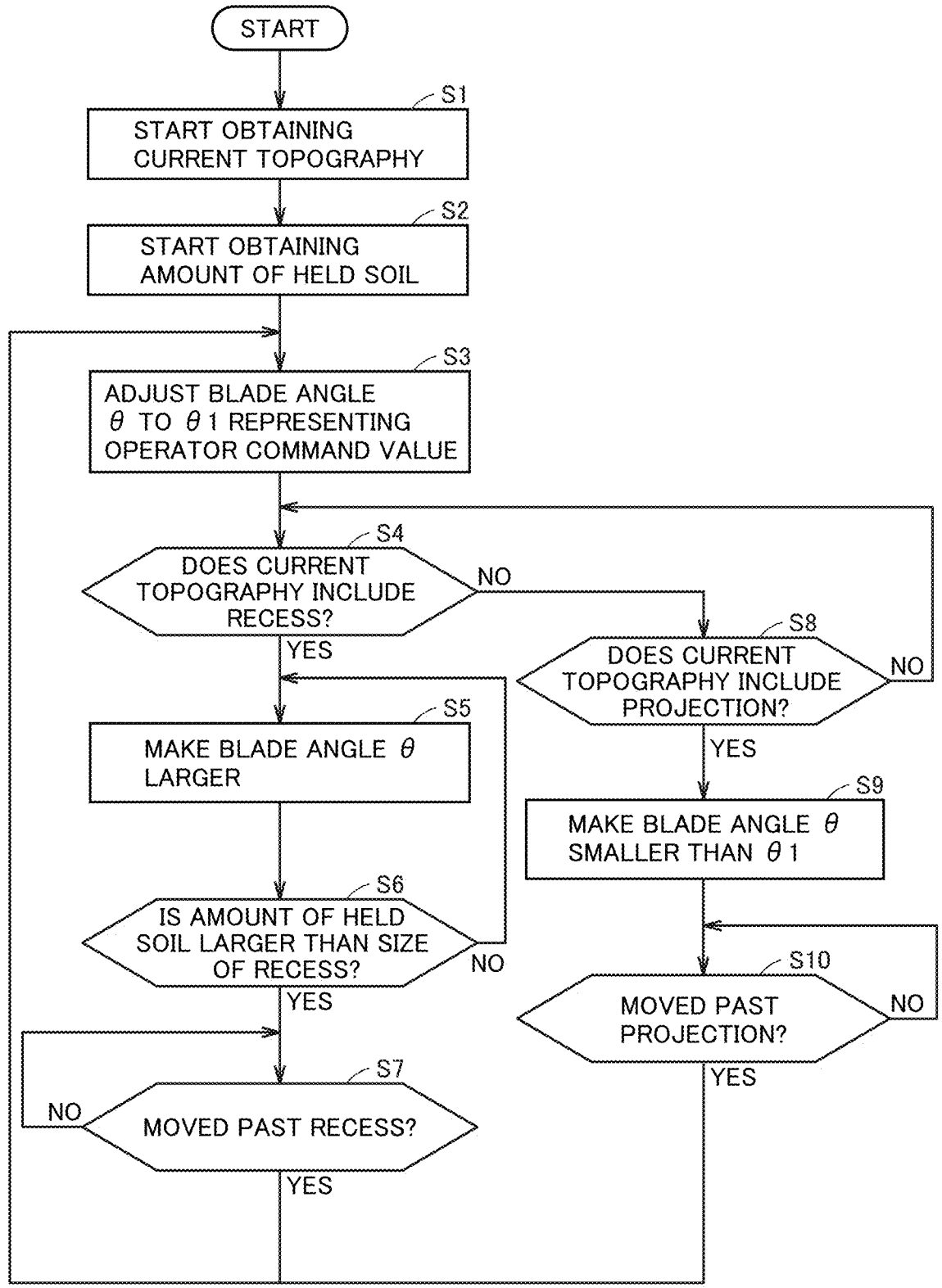
FIG. 12 is a flowchart for illustrating a typical example of control of a blade angle $\theta$ in the motor grader.

FIG. 12 is a flowchart for illustrating a typical example of control of blade angle θ in motor grader 1.

Referring to FIG. 12, in step S1, main controller 150 starts obtaining image data of current topography resulting from image pick-up by image pick-up apparatus 59. Main controller 150 determines whether or not the current topography includes projections and recesses each time it obtains the image data. In step S2, main controller 150 starts obtaining image data on the front surface of the blade resulting from image pick-up by image pick-up apparatus 60. Main controller 150 calculates an amount of soil held on the front surface of blade 42 each time it obtains the image data. In step S3, main controller 150 has swing circle 41 revolve so as to set blade angle θ to blade angle θ1 set by an operator.

In step S4, main controller 150 determines whether or not the current topography in front includes a recess. When main controller 150 determines the current topography as including the recess (YES in step S4), it has swing circle 41 revolve in step S5 so as to make blade angle θ larger than the current angle. In step S6, main controller 150 determines whether or not an amount of soil held on the front surface of blade 42 is larger than a size of the recess in the current topography. When main controller 150 determines the amount of held soil as not being larger than the size of the recess (NO in step S6), the process returns to step S5 and the main controller 150 has swing circle 41 revolve so as to set blade angle θ to be larger than the current angle.

When main controller 150 determines that the amount of held soil is larger than the size of the recess (YES in step S6), main controller 150 determines in step S7 whether or not the blade has moved past the recess. When main controller 150 determines that the blade has moved past the recess (YES in step S7), the process returns to step S3, and the main controller has swing circle 41 revolve so as to return blade angle θ to θ1 representing the operator command value. When main controller 150 determines that the blade has not moved past the recess (NO in step S7), the process returns to step S7.

When main controller 150 determines that the current topography in front does not include a recess (NO in step S4), main controller 150 determines in step S8 whether or not the current topography in front includes a projection. When main controller 150 determines that the current topography in front includes the projection (YES in step S8), the main controller has swing circle 41 revolve in step S9 so as to make blade angle θ smaller than θ1.

In step S10, main controller 150 determines whether or not the blade has moved past the projection. When main controller 150 determines that the blade has moved past the projection (YES in step S10), the process returns to step S3 and the main controller has swing circle 41 revolve in order to return blade angle θ to θ1 representing the operator command value. When main controller 150 determines that the blade has not moved past the projection (NO in step S10), the process returns to step S10.

<G. Modification>

Though motor grader 1 obtains current topography with image pick-up apparatus 59 in the above example, limitation thereto is not intended. A laser apparatus may be employed instead of image pick-up apparatus 59. In this case, current topography may be obtained by scanning the current topography with laser beams emitted from the laser apparatus.

Though a configuration in which motor grader 1 itself directly obtains current topography is described above by way of example, limitation thereto is not intended. For example, motor grader 1 may obtain information on current topography from a server which can communicate. Though an example in which current topography is obtained with image pick-up apparatus 59 is described as obtainment of current topography, the image pick-up apparatus does not necessarily have to be attached to motor grader 1, and image data from image pick-up apparatus 59 provided in another apparatus may be used or image data obtained in advance may be used. In this case, current topography in front of motor grader 1 may be obtained based on information on current topography obtained in advance and positional information of motor grader 1 obtained by providing a global navigation satellite system (GNSS) antenna in motor grader 1. In this regard, an approach to obtain image data is not limited in any manner. Design topography obtained in advance may be used as target topography (design topography). In this case, a height of blade 42 with respect to front wheel 11 is desirably adjusted such that the height of blade 42 with respect to front wheel 11 is maintained above the target topography.

Though motor grader 1 includes cab 3 in the embodiment described so far, motor grader 1 does not necessarily have to include cab 3. Motor grader 1 is not limited to such specifications that an operator is on board motor grader 1 to operate motor grader 1, but the specifications may be such that the motor grader is operated under external remote control. Since motor grader 1 does not require cab 3 for an operator to get on board in this case, motor grader 1 does not have to include cab 3.

<H. Additional Aspects>

(1) A method of controlling a motor grader is performed in a motor grader, the motor grader including a blade between a front wheel and a rear wheel, the blade being attached to a swing circle which adjusts a blade angle. The method includes obtaining current topography in front of the motor grader and adjusting the blade angle of the blade to an angle in accordance with the current topography by revolving the swing circle.

According to the method, the motor grader adjusts the blade angle to an angle in accordance with the current topography in front. Therefore, since works in accordance with the current topography can be done, efficiency in works can be improved.

(2) Preferably, the method of controlling a motor grader further includes determining whether or not the obtained current topography includes a recess. In the adjusting the blade angle, when the current topography is determined as including the recess, the swing circle is caused to revolve such that the blade angle is larger than the blade angle set by an operator of the motor grader.

According to the method, when the current topography in front includes the recess, the blade angle is made larger. Therefore, more soil than when the blade angle was set by the operator can be held in the blade. Therefore, more soil can be put into the recess than when the blade angle is not made larger.

(3) Preferably, the method of controlling a motor grader further includes determining a size of the recess. In the adjusting the blade angle, when the recess has a first size, the swing circle is caused to revolve such that the blade angle is set to a first angle larger than the blade angle set by the operator. In the adjusting the blade angle, when the recess has a second size larger than the first size, the swing circle is caused to revolve such that the blade angle is set to a second angle larger than the first angle.

According to the method, as the recess is larger in size, the blade angle is larger. Therefore, as the recess is larger in size, more soil can be held in the blade. Therefore, more soil can be put into the recess than in a configuration in which a blade angle is not controlled in accordance with a size of the recess.

(4) Preferably, in the determining a size of the recess, the size of the recess is determined based on at least one of a size of an opening of the recess and a depth of the recess. According to the method, a size of the recess can be determined.

(5) Preferably, the method of controlling a motor grader further includes determining whether or not the obtained current topography includes a projection. In the adjusting the blade angle, when the current topography is determined as including the projection, the swing circle is caused to revolve such that the blade angle is smaller than the blade angle set by an operator of the motor grader.

According to the method, when the current topography in front includes the projection, the blade angle is made smaller. Therefore, before the motor grader reaches the projection, an amount of soil held in the blade can be made smaller than when the blade angle was set by the operator. Therefore, the blade can hold more soil of the projection than when the blade angle is not made smaller. Therefore, soil of the projection can be leveled more uniformly than when the blade angle is not made smaller.

(6) Preferably, the method of controlling a motor grader further includes determining a size of the projection. In the adjusting the blade angle, when the projection has a first size, the swing circle is caused to revolve such that the blade angle is set to a first angle smaller than the blade angle set by the operator. In the adjusting the blade angle, when the projection has a second size larger than the first size, the swing circle is caused to revolve such that the blade angle is set to a second angle smaller than the first angle.

According to the method, as the projection is larger in size, the blade angle is smaller. Therefore, as the projection is larger in size, an amount of soil held in the blade can be made smaller before the motor grader reaches the projection. Therefore, soil can be leveled more uniformly than in a configuration in which a blade angle is not controlled in accordance with a size of the projection.

(7) Preferably, in the determining a size of the projection, the size of the projection is determined based on at least a height of the projection. According to the method, a size of the projection can be determined.

(8) Preferably, in the obtaining current topography, the current topography is obtained by picking up an image of the current topography with an image pick-up apparatus or scanning the current topography with laser. According to the method, the motor grader can obtain current topography in front.

(9) A method of controlling a motor grader is performed in a motor grader, the motor grader including a blade between a front wheel and a rear wheel, the blade being attached to a swing circle which adjusts a blade angle. The method includes obtaining current topography in front of the motor grader, obtaining an amount of soil on a front surface of the blade, and adjusting the blade angle of the blade to an angle in accordance with the current topography and the amount of soil by revolving the swing circle.

According to the method, the motor grader adjusts the blade angle to an angle in accordance with the current topography in front and an amount of soil on the front surface of the blade. Since the motor grader can thus do works while it adjusts the amount of soil in accordance with the current topography, efficiency in works can be improved.

(10) Preferably, the method further includes determining a size of a recess included in the obtained current topography. In the adjusting the blade angle, when the size of the recess is larger than the amount of soil, the swing circle is caused to revolve such that the blade angle is larger than a current blade angle.

According to the method, the blade angle is determined in accordance with the size of the recess and an amount of soil held in the blade. Therefore, the motor grader can hold more soil in the blade as the recess is larger in size. The motor grader can make adjustment to an amount of held soil optimal for the size of the recess. Therefore, since motor grader 1 can make adjustment to an optimal amount of soil held in the blade in accordance with the size of the recess, accuracy in land-grading and fuel efficiency can be improved.

(11) A motor grader includes a blade between a front wheel and a rear wheel, the blade being attached to a swing circle which adjusts a blade angle. The motor grader includes obtaining means for obtaining current topography in front of the motor grader and swing control means for adjusting a blade angle of the blade to an angle in accordance with current topography by having the swing circle revolve.

According to the configuration, the motor grader adjusts the blade angle to an angle in accordance with the current topography in front. Since works in accordance with the current topography can thus be done, efficiency in works can be improved.

(12) Preferably, the motor grader further includes recess determination means for determining whether or not the obtained current topography includes a recess. When the current topography is determined as including the recess, the swing control means has the swing circle revolve such that the blade angle is larger than the blade angle set by an operator of the motor grader.

According to the configuration, when the current topography in front includes the recess, the blade angle is made larger. Therefore, more soil than when the blade angle was set by the operator can be held in the blade. Therefore, more soil can be put into the recess than when the blade angle is not made larger.

(13) Preferably, the recess determination means further determines a size of the recess. When the recess has a first size, the swing control means has the swing circle revolve such that the blade angle is set to a first angle larger than the blade angle set by the operator. When the recess has a second size larger than the first size, the swing control means has the swing circle revolve such that the blade angle is set to a second angle larger than the first angle.

According to the configuration, as the recess is larger in size, the blade angle is larger. Therefore, as the recess is larger in size, more soil can be held in the blade. Therefore, more soil can be put into the recess than in a configuration in which a blade angle is not controlled in accordance with the size of the recess.

(14) Preferably, the recess determination means determines the size of the recess based on at least one of a size of an opening of the recess and a depth of the recess. According to the configuration, a size of the recess can be determined.

(15) Preferably, the motor grader further includes projection determination means for determining whether or not the obtained current topography includes a projection. When the current topography is determined as including the projection, the swing control means has the swing circle revolve such that the blade angle is smaller than the blade angle set by an operator of the motor grader.

According to the configuration, when the current topography in front includes the projection, the blade angle is made smaller. Therefore, before the motor grader reaches the projection, an amount of soil held in the blade can be made smaller than when the blade angle was set by the operator. Therefore, the blade can hold more soil of the projection than when the blade angle is not made smaller. Therefore, soil of the projection can be leveled more uniformly than when the blade angle is not made smaller.

(16) Preferably, the projection determination means further determines a size of the projection. When the projection has a first size, the swing control means has the swing circle revolve such that the blade angle is set to a first angle smaller than the blade angle set by the operator. When the projection has a second size larger than the first size, the swing control means has the swing circle revolve such that the blade angle is set to a second angle smaller than the first angle.

According to the configuration, as the projection is larger in size, the blade angle is smaller. Therefore, as the projection is larger in size, an amount of soil held in the blade can be made smaller before the motor grader reaches the projection. Therefore, soil can be leveled more uniformly than in a configuration in which a blade angle is not controlled in accordance with a size of the projection.

(17) Preferably, the projection determination means determines the size of the projection based on at least a height of the projection. According to the configuration, a size of the projection can be determined.

(18) Preferably, the obtaining means includes an image pick-up apparatus configured to pick up an image of the current topography or a laser emission apparatus configured to scan the current topography. According to the configuration, the motor grader can obtain current topography in front.

(19) A motor grader includes a blade between a front wheel and a rear wheel, the blade being attached to a swing circle which adjusts a blade angle. The motor grader includes a sensor configured to obtain current topography in front of the motor grader, an image pick-up apparatus configured to obtain an amount of soil on a front surface of the blade, and a controller configured to control revolution of the swing circle. The controller is configured to adjust the blade angle of the blade to an angle in accordance with the current topography and the amount of soil by having the swing circle revolve.

According to the configuration, the motor grader adjusts the blade angle to an angle in accordance with the current topography in front and the amount of soil on the front surface of the blade. Since the motor grader can thus do works while it adjusts the amount of soil in accordance with the current topography, efficiency in works can be improved.

(20) Preferably, the controller is configured to determine a size of a recess included in the obtained current topography. When the size of the recess is larger than the amount of soil, the controller has the swing circle revolve such that the blade angle is larger than a current blade angle.

According to the configuration, the blade angle is determined in accordance with a size of the recess and an amount of soil held in the blade. Therefore, the motor grader can hold more soil in the blade as the recess is larger in size. The motor grader can make adjustment to an amount of held soil optimal for a size of the recess. Therefore, since motor grader 1 can make adjustment to an optimal amount of soil held in the blade in accordance with a size of the recess, accuracy in land-grading and fuel efficiency can be improved.

The embodiment disclosed herein is illustrative and not restricted to the above disclosure alone. The scope of the present invention is defined by the terms of the claims and is intended to include any modifications within the scope and meaning equivalent to the terms of the claims.

REFERENCE SIGNS LIST 1 motor grader; 2 vehicular body frame; 3 cab; 4 work implement; 11 front wheel; 12 rear wheel; 19 axle shaft; 21 rear frame; 22 front frame; 40 draw bar; 41 swing circle; 42 blade; 44, 45 lift cylinder; 46 draw bar shift cylinder; 47 blade shift cylinder; 48 tilt cylinder; 49 slewing motor; 51 counter weight; 59, 60 image pick-up apparatus; 117 gear shift lever; 118 work implement lever; 120 locking switch; 131A first hydraulic pump; 131B second hydraulic pump; 132 swash plate drive apparatus; 135 hydraulic actuator; 136 engine; 138 engine controller; 139 throttle dial; 148 transmission controller; 149 transmission; 150 main controller; 151 operation content determination unit; 154 engine output control unit; 156 control valve control unit; 157 determination unit; 361 swing control unit; 371 recess determination unit; 372 projection determination unit; 373 soil amount determination unit; 710 recess; 720 projection; 910 rotation axis; 920 central axis; and AX optical axis

The invention claimed is:

1. A method of controlling a motor grader, the motor grader including a blade between a front wheel and a rear wheel, the blade being attached to a swing circle which adjusts a blade angle, the method comprising:
obtaining current topography in front of the motor grader;
determining whether the obtained current topography includes a recess; and
adjusting the blade angle of the blade to an angle in accordance with the current topography by revolving the swing circle, wherein in the adjusting the blade angle, when the current topography is determined as including the recess, the swing circle is caused to revolve such that the blade angle is larger than the blade angle set by an operator of the motor grader.

2. The method of controlling a motor grader according to claim 1, further comprising determining a size of the recess, wherein
in the adjusting the blade angle, when the recess has a first size, the swing circle is caused to revolve such that the blade angle is set to a first angle larger than the blade angle set by the operator, and when the recess has a second size larger than the first size, the swing circle is caused to revolve such that the blade angle is set to a second angle larger than the first angle.

3. The method of controlling a motor grader according to claim 2, wherein
in the determining a size of the recess, the size of the recess is determined based on at least one of a size of an opening of the recess and a depth of the recess.

4. The method of controlling a motor grader according to claim 1, wherein
in the obtaining current topography, the current topography is obtained by picking up an image of the current topography with an image pick-up apparatus or scanning the current topography with laser.

5. A method of controlling a motor grader, the motor grader including a blade between a front wheel and a rear wheel, the blade being attached to a swing circle which adjusts a blade angle, the method comprising:
obtaining current topography in front of the motor grader;
determining whether the obtained current topography includes a projection; and
adjusting the blade angle of the blade to an angle in accordance with the current topography by revolving the swing circle, wherein in the adjusting the blade angle, when the current topography is determined as including the projection, the swing circle is caused to revolve such that the blade angle is smaller than the blade angle set by an operator of the motor grader.

6. The method of controlling a motor grader according to claim 5, further comprising determining a size of the projection, wherein
in the adjusting the blade angle, when the projection has a first size, the swing circle is caused to revolve such that the blade angle is set to a first angle smaller than the blade angle set by the operator, and when the projection has a second size larger than the first size, the swing circle is caused to revolve such that the blade angle is set to a second angle smaller than the first angle.

7. The method of controlling a motor grader according to claim 6, wherein
in the determining a size of the projection, the size of the projection is determined based on at least a height of the projection.

8. The method of controlling a motor grader according to claim 5, wherein
in the obtaining current topography, the current topography is obtained by picking up an image of the current topography with an image pick-up apparatus or scanning the current topography with laser.

9. A method of controlling a motor grader, the motor grader including a blade between a front wheel and a rear wheel, the blade being attached to a swing circle which adjusts a blade angle, the method comprising:
obtaining current topography in front of the motor grader;
obtaining, from an image pick-up apparatus arranged in front of the blade, an amount of soil on a front surface of the blade; and
adjusting the blade angle of the blade to an angle in accordance with the current topography and the amount of soil by revolving the swing circle.

10. The method of controlling a motor grader according to claim 9, further comprising determining a size of a recess included in the obtained current topography, wherein
in the adjusting the blade angle, when the size of the recess is larger than the amount of soil, the swing circle is caused to revolve such that the blade angle is larger than a current blade angle.

11. A motor grader comprising:
a swing circle configured to adjust a blade angle;
a front wheel;
a rear wheel;

a blade attached to the swing circle, the blade being provided between the front wheel and the rear wheel;

a sensor arranged in front of the blade and configured to obtain current topography in front of the motor grader; and a controller configured to control revolution of the swing circle, the controller being configured to adjust the blade angle of the blade to an angle in accordance with the current topography by having the swing circle revolve, wherein the controller is configured to:

determine whether the obtained current topography includes a recess, and when the current topography is determined as including the recess, have the swing circle revolve such that the blade angle is larger than the blade angle set by an operator of the motor grader.

12. The motor grader according to claim 11, wherein the controller is configured to further determine a size of the recess, when the recess has a first size, have the swing circle revolve such that the blade angle is set to a first angle larger than the blade angle set by the operator, and when the recess has a second size larger than the first size, have the swing circle revolve such that the blade angle is set to a second angle larger than the first angle.

13. The motor grader according to claim 12, wherein the controller is configured to determine the size of the recess based on at least one of a size of an opening of the recess and a depth of the recess.

14. The motor grader according to claim 11, wherein the sensor is implemented by an image pick-up apparatus configured to pick up an image of the current topography or a laser emission apparatus configured to scan the current topography.

15. A motor grader comprising:

a swing circle configured to adjust a blade angle;

a front wheel;

a rear wheel;

a blade attached to the swing circle, the blade being provided between the front wheel and the rear wheel;

a sensor arranged in front of the blade and configured to obtain current topography in front of the motor grader; and a controller configured to control revolution of the swing circle, the controller being configured to adjust the blade angle of the blade to an angle in accordance with the current topography by having the swing circle revolve, wherein the controller is configured to:

determine whether the obtained current topography includes a projection, and when the current topography is determined as including the projection, have the swing circle revolve such that the blade angle is smaller than the blade angle set by an operator of the motor grader.

16. The motor grader according to claim 15, wherein the controller is further configured to determine a size of the projection, when the projection has a first size, have the swing circle revolve such that the blade angle is set to a first angle smaller than the blade angle set by the operator, and when the projection has a second size larger than the first size, have the swing circle revolve such that the blade angle is set to a second angle smaller than the first angle.

17. The motor grader according to claim 16, wherein the controller is configured to determine the size of the projection based on at least a height of the projection.

18. The motor grader according to claim 15, wherein the sensor is implemented by an image pick-up apparatus configured to pick up an image of the current topography or a laser emission apparatus configured to scan the current topography.

19. A motor grader comprising:

a swing circle configured to adjust a blade angle;

a front wheel;

a rear wheel;

a blade attached to the swing circle, the blade being provided between the front wheel and the rear wheel;

a sensor configured to obtain current topography in front of the motor grader;

an image pick-up apparatus arranged in front of the blade and configured to obtain an amount of soil on a front surface of the blade; and a controller configured to control revolution of the swing circle, the controller being configured to adjust the blade angle of the blade to an angle in accordance with the current topography and the amount of soil by having the swing circle revolve.

20. The motor grader according to claim 19, wherein the controller is configured to determine a size of a recess included in the obtained current topography, and when the size of the recess is larger than the amount of soil, have the swing circle revolve such that the blade angle is larger than a current blade angle.

* * * * *